US012596675B2

(12) United States Patent
Jiang et al.

(10) Patent No.: US 12,596,675 B2
(45) Date of Patent: Apr. 7, 2026

(54) METHOD, ELECTRONIC DEVICE, AND COMPUTER PROGRAM PRODUCT FOR MIGRATING DATA

(71) Applicant: Dell Products L.P., Round Rock, TX (US)

(72) Inventors: Changxu Jiang, Chengdu (CN); Robin Fei Wang, Chengdu (CN)

(73) Assignee: DELL PRODUCTS L.P., Round Rock, TX (US)

( * ) Notice: Subject to any disclaimer, the term of this patent is extended or adjusted under 35 U.S.C. 154(b) by 23 days.

(21) Appl. No.: 18/477,267

(22) Filed: Sep. 28, 2023

(65) Prior Publication Data

US 2025/0028678 A1      Jan. 23, 2025

(30) Foreign Application Priority Data

Jul. 21, 2023    (CN) .......................... 202310905940.4

(51) Int. Cl.
*G06F 16/00*      (2019.01)
*G06F 16/11*      (2019.01)
*G06F 16/14*      (2019.01)
*G06F 16/17*      (2019.01)

(52) U.S. Cl.
CPC .......... *G06F 16/119* (2019.01); *G06F 16/156* (2019.01); *G06F 16/1727* (2019.01)

(58) Field of Classification Search
CPC .. G06F 16/119; G06F 16/156; G06F 16/1727; G06F 16/16
See application file for complete search history.

(56) References Cited

U.S. PATENT DOCUMENTS 8,762,995 B2 *    6/2014   Akaike ................. G06F 3/0665
                                                            718/101
2018/0152505 A1 *  5/2018   Averett ............... H04L 67/1097

FOREIGN PATENT DOCUMENTS

TW             202117529 A  *  5/2021   ............. G06F 16/13

* cited by examiner

*Primary Examiner* — Dinku W Gebresenbet
(74) *Attorney, Agent, or Firm* — Amin, Turocy & Watson, LLP

(57) ABSTRACT

The subject technology generally relates to migration of data. An example method includes determining, in response to determining that a source storage system satisfies a migration condition and based on used space of folders in a source file system on the source storage system, migration scores for the folders. The method further includes determining, from the folders, one or more folders to be migrated by sorting the migration scores. In addition, the method further includes migrating the one or more folders to a target file system. As a result of such data migration, by scoring and sorting a group of folders on a source file system and selecting the optimal one or more folders for migration, the migration of the entire file system is avoided, thereby reducing the overall cost of data migration and increasing the speed of data migration.

20 Claims, 11 Drawing Sheets

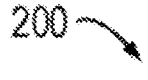

Determining, in response to determining that a source storage system satisfies a migration condition and based on a set of used space of a group of folders in a source file system on the source storage system, a group of migration scores for the group of folders

202

Determining, from the group of folders, one or more folders to be migrated by sorting the group of migration scores

204

Selecting a target storage system from a set of target storage systems

206

Migrating the one or more folders to be migrated to a target file system in the target storage system

208

Redirecting one or more links for the one or more folders to be migrated to the target file system

Figure 4:
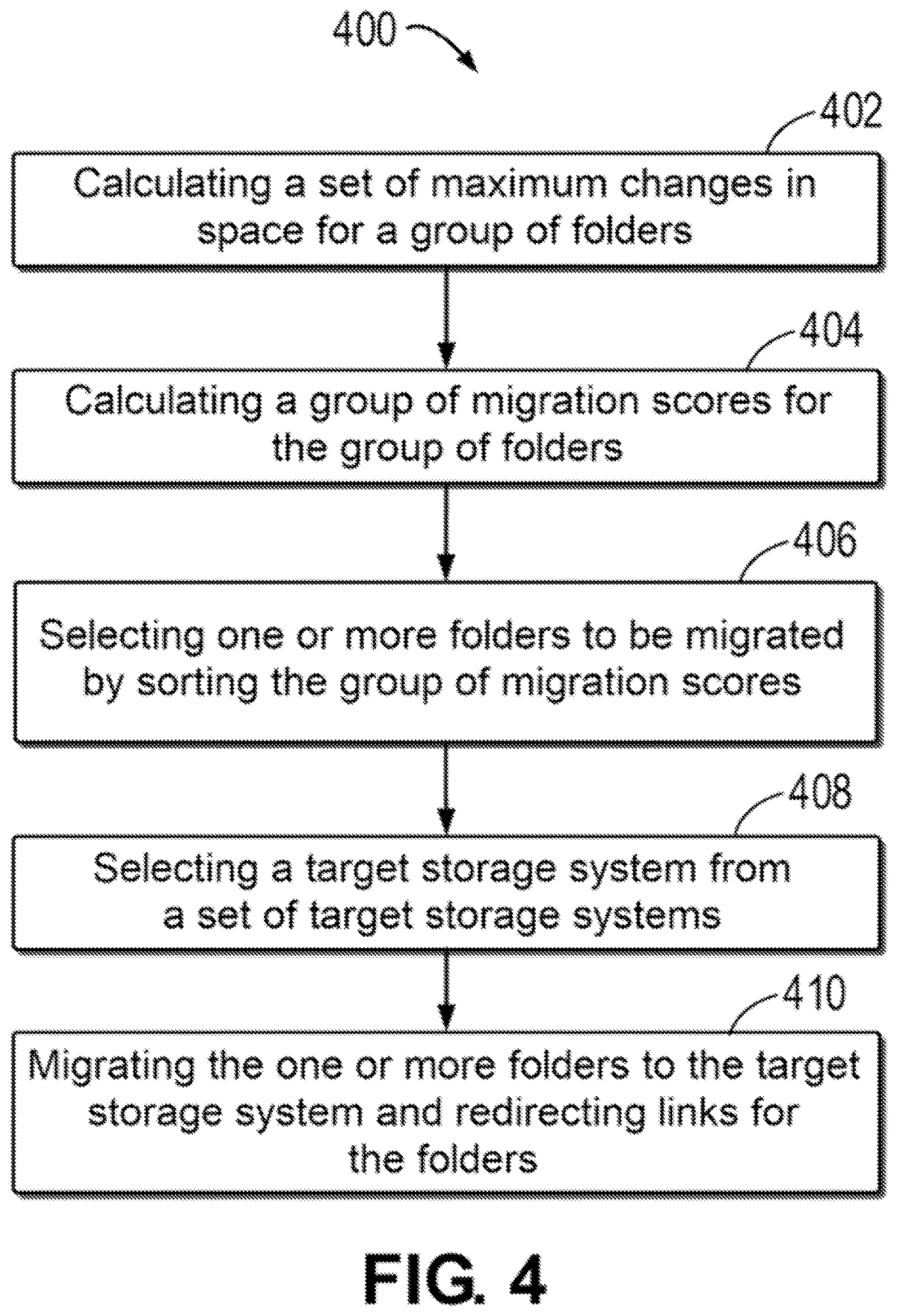

Calculating a set of maximum changes in space for a group of folders

404

Calculating a group of migration scores for the group of folders

406

Selecting one or more folders to be migrated by sorting the group of migration scores

408

Selecting a target storage system from a set of target storage systems

410

Migrating the one or more folders to the target storage system and redirecting links for the folders

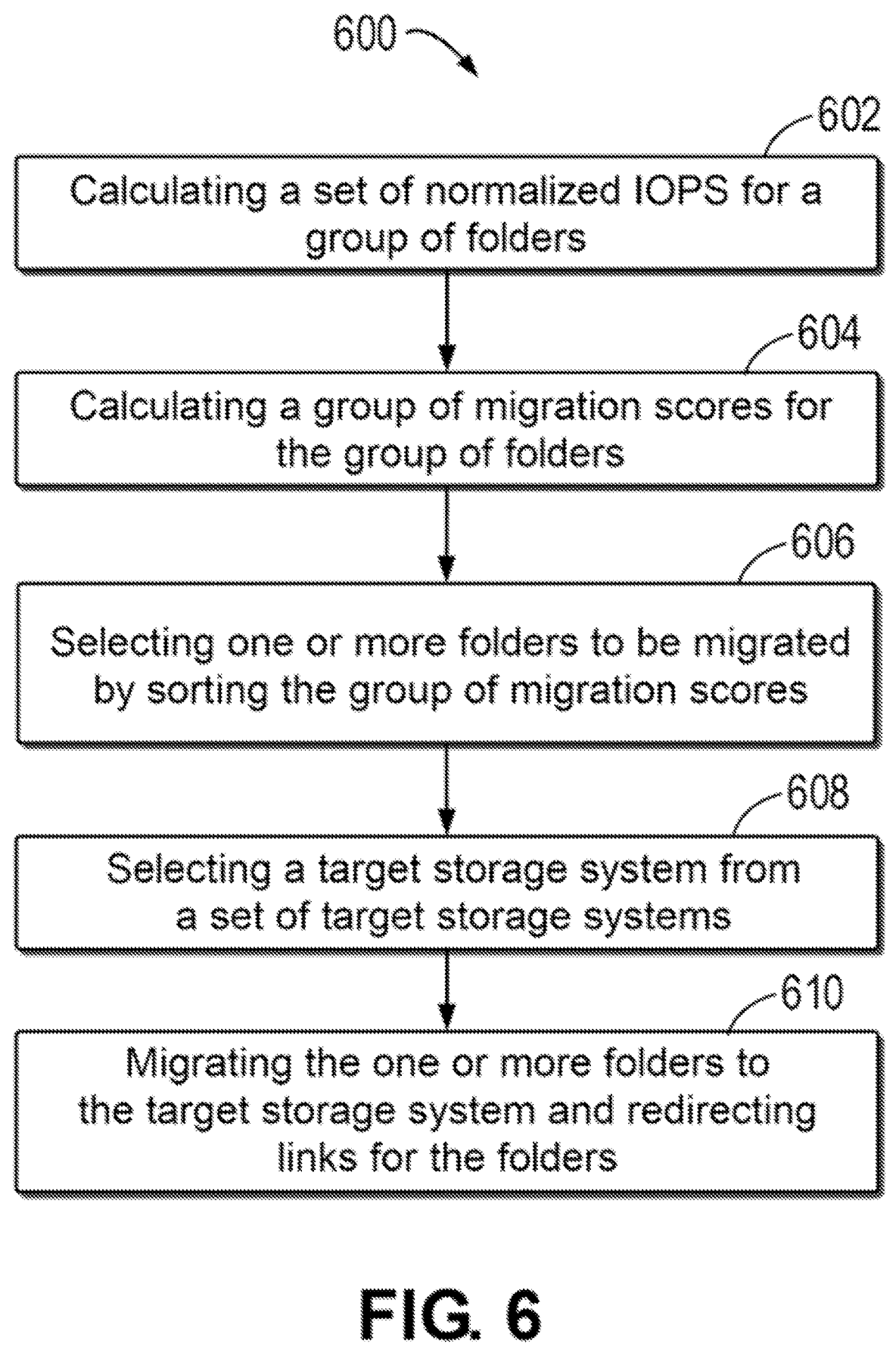

Calculating a set of normalized IOPS for a group of folders

604

Calculating a group of migration scores for the group of folders

606

Selecting one or more folders to be migrated by sorting the group of migration scores

608

Selecting a target storage system from a set of target storage systems

610

Migrating the one or more folders to the target storage system and redirecting links for the folders

FIG. 6

METHOD, ELECTRONIC DEVICE, AND COMPUTER PROGRAM PRODUCT FOR MIGRATING DATA

RELATED APPLICATION

The present application claims the benefit of priority to Chinese Patent Application No. 202310905940.4, filed on Jul. 21, 2023, which application is hereby incorporated into the present application by reference herein in its entirety.

TECHNICAL FIELD

Embodiments of the present disclosure relate generally to the field of computers, and more specifically to a method, an electronic device, and a computer program product for migrating data.

BACKGROUND

As technology continues to evolve, storage services and storage products are being used in an ever-expanding range of applications, and playing a key role in a wide range of industries. Users ranging from individual users to large enterprises rely on storage services and storage products to handle the growing demand for data. Efficient and reliable storage solutions have become a key element in driving innovation and improving efficiency. The continuous development of storage services and products can create more convenience for digital life and enterprise development.

Data migration becomes very important when storage products encounter emergencies (e.g., a storage space shortage, a too high load, and so on). Migrating data can protect important information in time and ensure business continuity and stability. In addition, the level of the migration cost is critical. Reducing the cost of migration means a more efficient recovery process, reducing business downtime, and reducing costs and waste of resources during emergencies. Therefore, it is important to find and adopt solutions that enable data migration to be completed quickly, securely, and efficiently, thereby ensuring the reliability and stability of the storage system.

SUMMARY

Embodiments of the present disclosure provide a method, a device, and a computer program product for migration of data.

In one example embodiment of the present disclosure, a method for migrating data is provided. The method includes determining, in response to determining that a source storage system satisfies a migration condition and based on a set of used space of a group of folders in a source file system on the source storage system, a group of migration scores for the group of folders. The method further includes determining, from the group of folders, one or more folders to be migrated by sorting the group of migration scores. The method further includes selecting a target storage system from a set of target storage systems. The method further includes migrating the one or more folders to be migrated to a target file system in the target storage system. In addition, the method further includes redirecting one or more links for the one or more folders to be migrated to the target file system.

In another example embodiment of the present disclosure, an electronic device is provided. The device includes a processing unit and a memory, wherein the memory is coupled to the processing unit and stores instructions. The instructions, when executed by the processing unit, perform the following actions: determining, in response to determining that a source storage system satisfies a migration condition and based on a set of used space of a group of folders in a source file system on the source storage system, a group of migration scores for the group of folders; determining, from the group of folders, one or more folders to be migrated by sorting the group of migration scores; selecting a target storage system from a set of target storage systems; migrating the one or more folders to be migrated to a target file system in the target storage system; and redirecting one or more links for the one or more folders to be migrated to the target file system.

In still another example embodiment of the present disclosure, a computer program product is provided. The computer program product is tangibly stored in a non-transitory computer-readable medium and contains computer-executable instructions. The computer-executable instructions, when executed, cause a computer to perform a method or process according to the embodiments of the present disclosure.

This Summary part is provided to introduce the selection of concepts in a simplified form, which will be further described in the Detailed Description below. This Summary part is neither intended to identify key features or essential features of the present disclosure, nor intended to limit the scope of the embodiments of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same elements.

FIG. 2 illustrates a flow chart of a method for migrating data according to some embodiments of the present disclosure;

FIG. 4 illustrates a flow chart of a method for migrating data according to some embodiments of the present disclosure;

FIG. 6 illustrates a flow chart of a method for migrating data according to some embodiments of the present disclosure.

DETAILED DESCRIPTION

Example embodiments of the present disclosure will be described in more detail below with reference to the accompanying drawings. While some specific embodiments of the present disclosure are shown in the accompanying drawings, it should be understood that the present disclosure may be implemented in various forms, and should not be limited to the embodiments set forth herein. Rather, these embodiments are provided to make the present disclosure more thorough and complete and to fully convey the scope of the present disclosure to those skilled in the art.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects, unless otherwise specifically indicated.

When a storage system encounters an emergency situation and needs to migrate a file system on the storage system, it is usually to migrate the file system as a whole to alleviate the problems of the storage system, which will lead to too high migration costs, and at the same time, due to the need for migration as a whole, the migration speed will be very low.

To this end, embodiments of the present application provide a solution for migration of data, which can avoid migrating the entire file system by selecting one or more folders from the file system for migration when performing data migration. In addition, by scoring and sorting the folders, the optimal one or more folders with low migration costs are selected for migration, thereby reducing the overall cost of data migration and increasing the speed of data migration.

Figure 1:
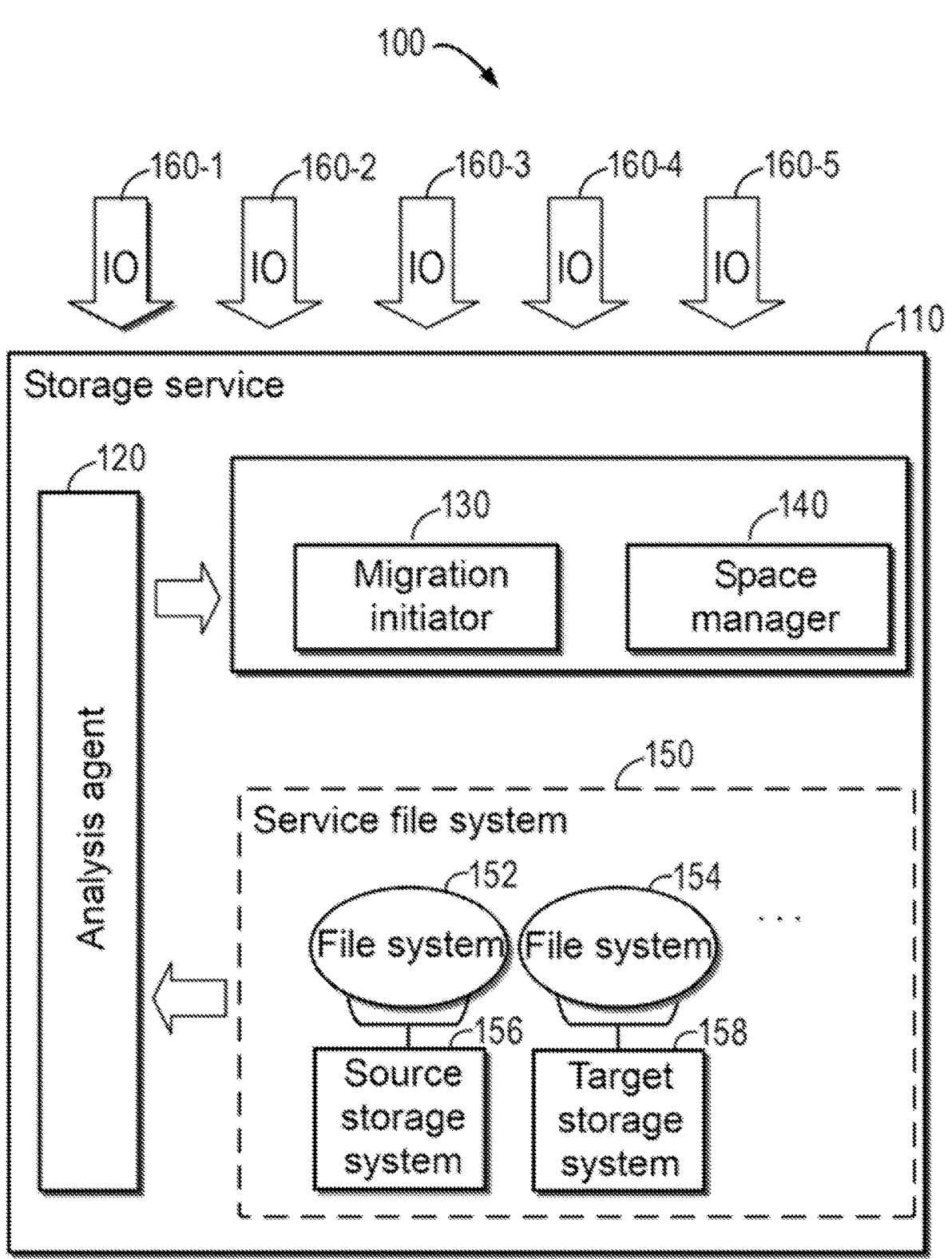
FIG. 1 illustrates a schematic diagram of an example environment in which embodiments of the present disclosure can be implemented.

FIG. 1 illustrates a schematic diagram of an example environment 100 in which embodiments of the present disclosure can be implemented. As shown in FIG. 1, the example environment 100 includes a storage service 110, the storage service 110 including an analysis agent 120, a migration initiator 130, a space manager 140, and a service file system 150. The analysis agent 120 can create a plurality of criteria to track various scenarios that trigger data migration, for example, load balancing and storage space balancing, to trigger migration of folders by the migration initiator 130. In some embodiments, the analysis agent 120 can track services for the operation state of the storage system to continuously monitor whether the storage system is likely to encounter a storage space shortage in the future, or whether the IO load on each storage system continuously exceeds a load threshold for a long period of time. In some embodiments, the analysis agent 120 determines one or more folders to be migrated from a group of folders in a file system 152 on a source storage system 156. The problem of a space shortage or a too high IO load on the source storage system 156 is alleviated by migrating the one or more folders in the file system 152 on the source storage system 156 to a file system 154 on a target storage system 158.

After the analysis agent 120 determines that folder migration is to be performed, the migration is performed by the migration initiator 130 on the one or more folders, and a space assessment is performed by the space manager 140 to confirm the space occupancies on the source storage system 156 and the target storage system 158. The service file system 150 manages file systems. For example, the service file system 150 includes the file system 152 and the file system 154. It should be understood that two file systems are shown herein as an example, and the service file system 150 may include a greater number of file systems. For example, the file system 152 is a source file system, and the file system 154 is a target file system. The one or more folders of the file system 152 are migrated by the migration initiator 130 to the file system 154 (or the file system 154 is created if it does not exist). Thus, the file system 152 and the file system 154 are corresponding file systems that together store a set of files on the file system 152 before migration. The service file system 150 manages a plurality of file systems, and it should be understood that the file system 150 does not include a storage system. As shown in FIG. 1, the file system 152 is on the source storage system 156, while the file system 154 is on the target storage system 158. Upon receiving IO 160-1, IO 160-1, IO 160-2, IO 160-3, IO 160-4, and IO 160-5 (individually or uniformly referred to as IO 160) from different hosts, the storage service 110 can send the IO 160 to folders of corresponding file systems.

FIG. 2 illustrates a flow chart of a method 200 for migrating data according to some embodiments of the present disclosure. At 202, in response to determining that a source storage system satisfies a migration condition and based on a set of used space of a group of folders in a source file system on the source storage system, a group of migration scores for the group of folders are determined. For example, a migration score for each folder is calculated based on the used space of the folders in the group of folders, so that the used space of the folders is taken into account when calculating the migration scores for the folders.

At 204, one or more folders to be migrated are determined from the group of folders by sorting the group of migration scores. For example, when it is determined that the source storage system satisfies the migration condition, one or more folders on the file system are selected for migration, rather than migrating the file system as a whole.

At 206, a target storage system is selected from a set of target storage systems. For example, when migration is performed, there are often a plurality of target storage systems that can be used as the destination of the migration, so it is necessary to select a suitable target storage system to ensure that the one or more folders migrated do not affect the normal operation of the target file system.

At 208, the one or more folders to be migrated are migrated to a target file system in the target storage system. For example, the one or more folders to be migrated are migrated to the target file system, so as to alleviate the emergency situation of the source storage system, thus ensuring normal operation of the source storage system and the source file system. At 210, one or more links for the one or more folders to be migrated are redirected to the target file system. For example, when the one or more folders are migrated to the target file system, a group of folders that originally belonged to the same file system are stored across storage systems; therefore, the one or more links for the one or more folders need to be redirected to ensure that data IOs can access corresponding folders.

Thus, the data migration scheme according to embodiments of the present disclosure can avoid migrating the entire file system by selecting one or more folders from the file system for migration. In addition, by scoring and sorting the folders, the optimal one or more folders with low migration costs are selected for migration, thereby reducing the cost of data migration and increasing the speed of data migration.

Figure 3A:
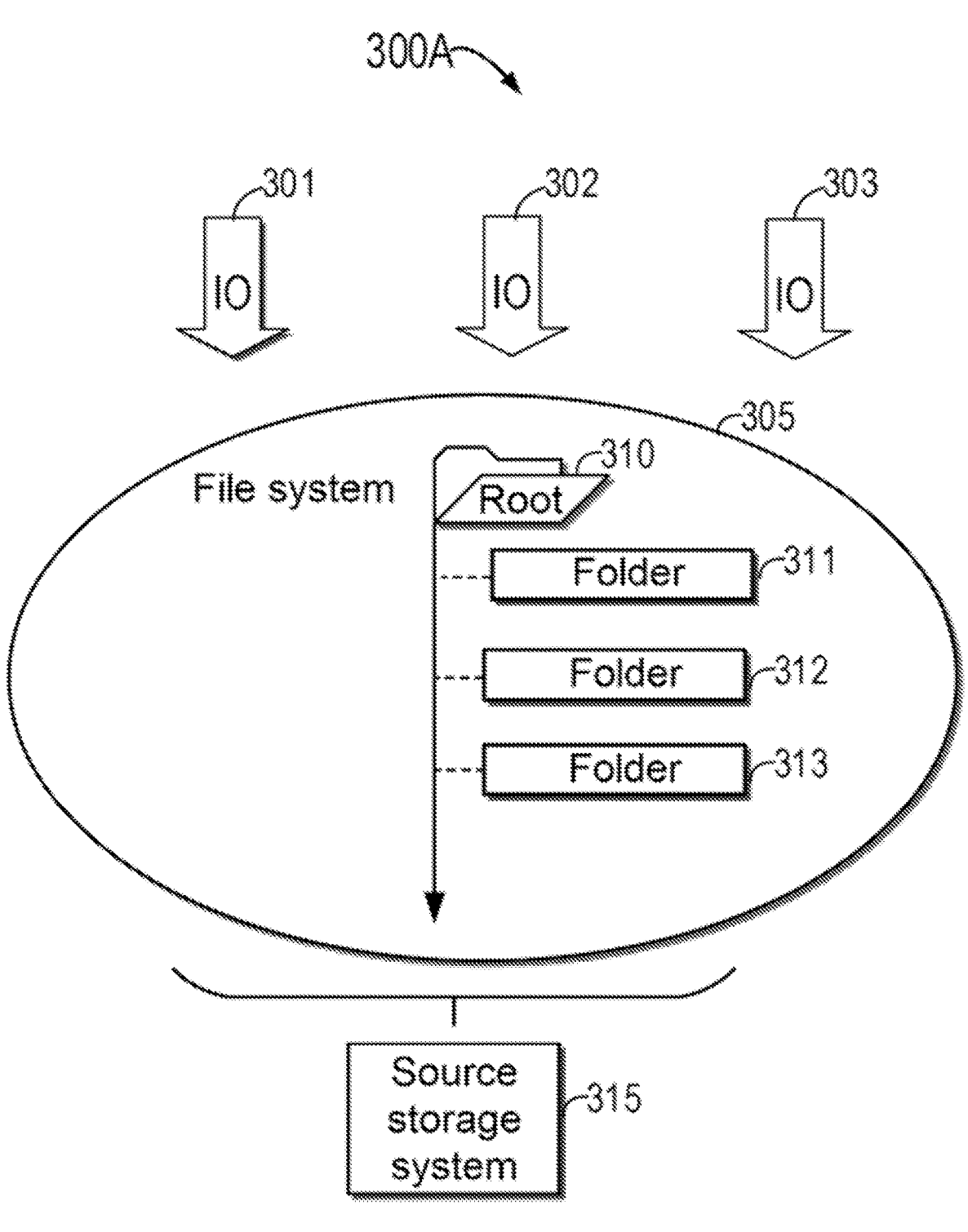
FIGS. 3A-3B illustrate schematic diagrams of service file systems according to some embodiments of the present disclosure.

FIG. 3A illustrates a schematic diagram of a service file system 300A according to some embodiments of the present disclosure. As shown in FIG. 3A, the service file system 300A includes a file system 305, the file system 305 including a root 310, a folder 311, a folder 312, and a folder 313. An IO 301 may be an accessing IO directed to the folder 311, an IO 302 may be an accessing IO directed to the folder 312, and an IO 303 may be an accessing IO directed to the folder 313. As shown in FIG. 3A, the file system 305 is stored on a source storage system 315. In some embodiments, since the source storage system 315 has not experienced an emergency situation, for example, a storage space shortage or a too high IO load for a long period of time, folders on the file system 305 have not been migrated to other storage systems, and thus the service file system 300A has only the file system 305 on the source storage system 315.

Figure 3B:
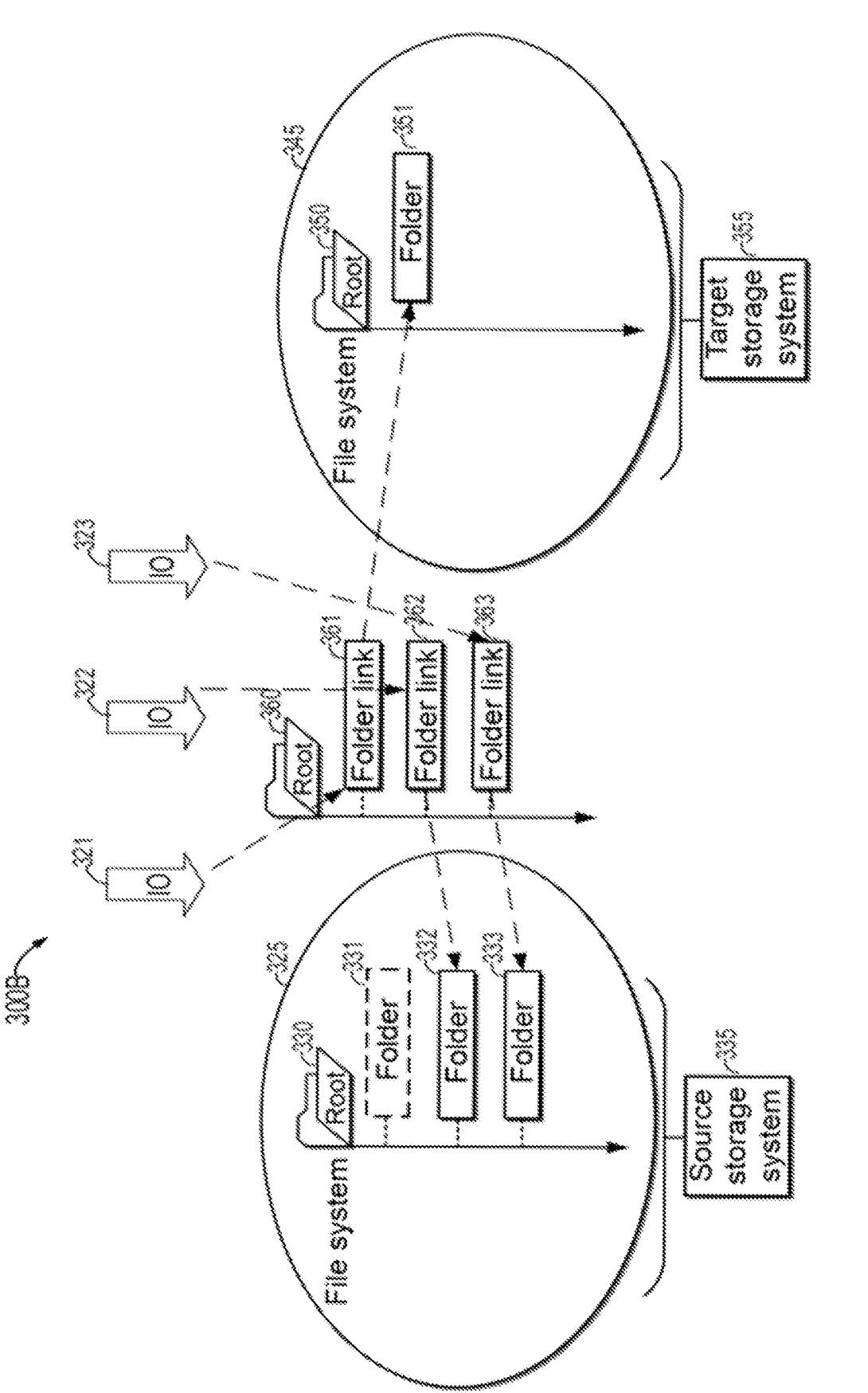

FIG. 3B illustrates a schematic diagram of a service file system 300B according to some embodiments of the present disclosure. As shown in FIG. 3B, an analysis agent (e.g., the analysis agent 120 shown in FIG. 1) monitors the state of a source storage system 335 and determines that an emergency situation (e.g., a storage space shortage or a too high IO load) is about to occur on the source storage system 335, and chooses to migrate a folder 331 on a file system 325 to a file system 345 on a target storage system 355, and after the migration, the folder 331 is shown as a folder 351 on the file system 345 in FIG. 3B, which means that the folder 351 is obtained through the migration of the folder 331. Since the folder 331 is migrated to the target storage system 355, the emergency situation that may occur on the source storage system 335 is alleviated. For example, the storage space is reduced, and the load IO is also reduced.

In some embodiments, the link root directory 360 may be used to redirect the accessing IOs to corresponding folders. It can be understood that, when one or more folders in the file system are migrated for the first time, the link root directory 360 will be created accordingly. As shown in FIG. 3B, the IO 321 is redirected to the folder 351 on the file system 345 by a folder link 361 in the link root directory 360, the IO 322 is redirected to the folder 332 on the file system 325 by a folder link 362, and the IO 321 is redirected to the folder 333 on the file system 325 by a folder link 363.

Figure 3C:
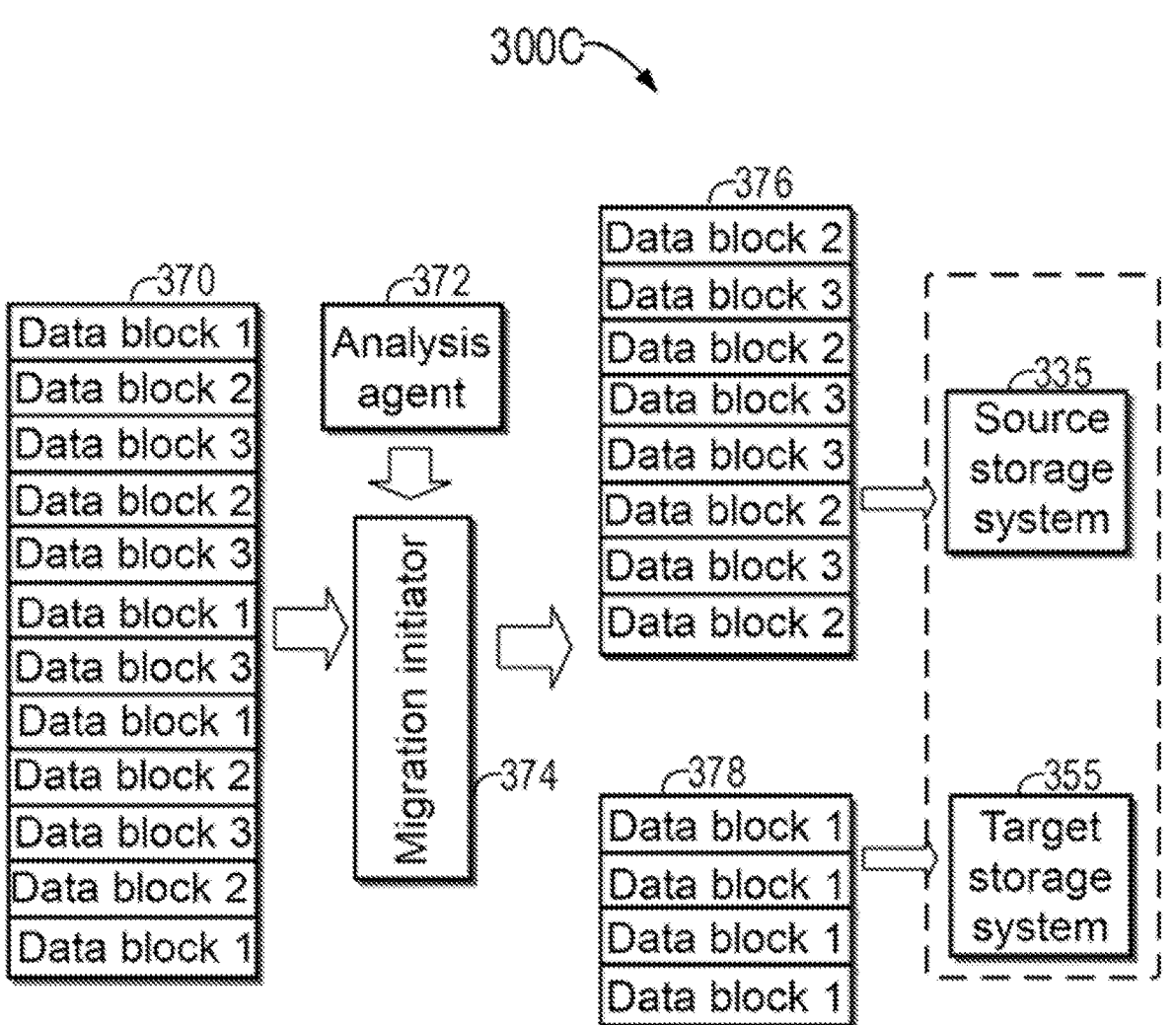
FIG. 3C illustrates a schematic diagram of a process for storing incoming data according to some embodiments of the present disclosure.

FIG. 3C illustrates a schematic diagram of a process 300C for storing incoming data according to some embodiments of the present disclosure. Data 370 includes a plurality of data blocks 1, data blocks 2, and data blocks 3, and will be described in conjunction with FIGS. 3A and 3B, wherein a data block 1 indicates that the data block is to be written to the folder 311 in FIG. 3A, and similarly, a data block 2 indicates that the data block is to be written to the folder 312, and a data block 3 indicates that the data block is to be written to the folder 313. Through the analysis agent 372 and the migration initiator 374, data 376 is stored to the source storage system 335 (i.e., the source storage system 335 in FIG. 3B), and since the folder 332 and the folder 331 are on the source storage system 335, the data 376 associated with the folder 332 and the folder 331 is stored on the source storage system 335. In addition, data 378 associated with the folder 335 is stored on the target storage system 355.

FIG. 4 illustrates a flow chart of a method 400 for migrating data according to some embodiments of the present disclosure. The analysis agent monitors and analyzes the storage space of the source storage system, and when it predicts that the storage space of the source storage system will experience a storage space shortage at a certain point in time, an alert is issued to trigger the migration service. By using the method 400 to select one or more folders to be migrated, the problem of the storage space shortage can be alleviated. For example, the analysis agent (e.g., the analysis agent 120 as shown in FIG. 1) determines that the space of the source storage system will experience a storage space shortage for a period of time, and then triggers the process of folder migration. FIGS. 5A to 5D illustrate diagrams of the storage system and the file system during execution of the method 400, and the process of the method 400 will be described below in conjunction with FIGS. 5A to 5D. At block 402, a set of maximum changes in space for the group of folders are calculated. For example, $t_s$ is a current point in time and $t_o$ is a predicted point in time at which it is predicted that there is going to be a storage space shortage, where $t_s+T<t_o<t_s+\alpha*T$, $\alpha$ being an expansion parameter, and T being a time interval parameter. H[n] is used to denote a group of folders of the source file system on the source storage system n, where the length of H[n] is K, which means that there are K folders on the group of folders of the source file system, and then the set of maximum changes in space are calculated by using Equation 1:

$$\text{delta\_space}[k] = \max_{t_s<t\le t_0} (\text{used\_space}[k](t) - \text{used\_space}[k](t_s)) \quad (1)$$

where delta_space[k] denotes a set of maximum changes in space, used_space[k](t) denotes a set of used space at moment t, and used_space[k]($t_s$) denotes a set of used space at moment $t_s$.

Figure 5A:
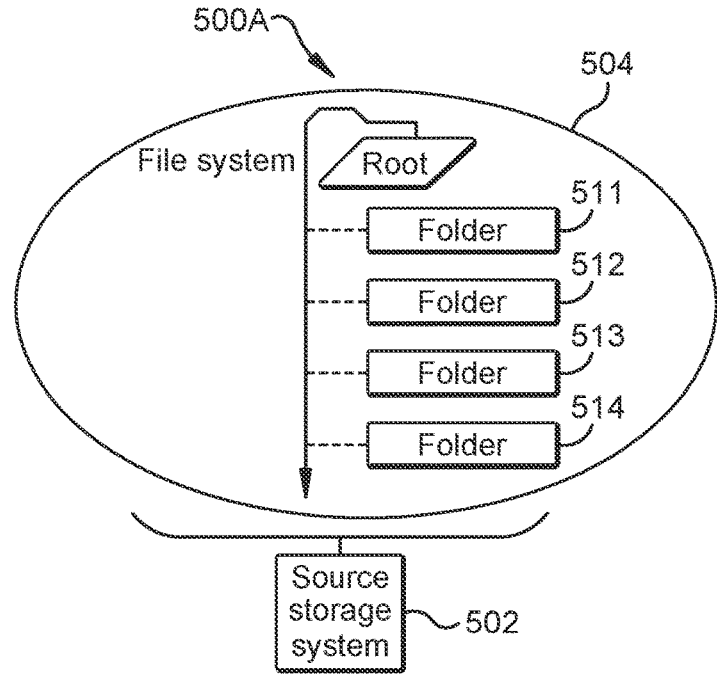
FIGS. 5A-5D illustrate schematic diagrams of a storage system and a file system according to some embodiments of the present disclosure.
Figure 5B:
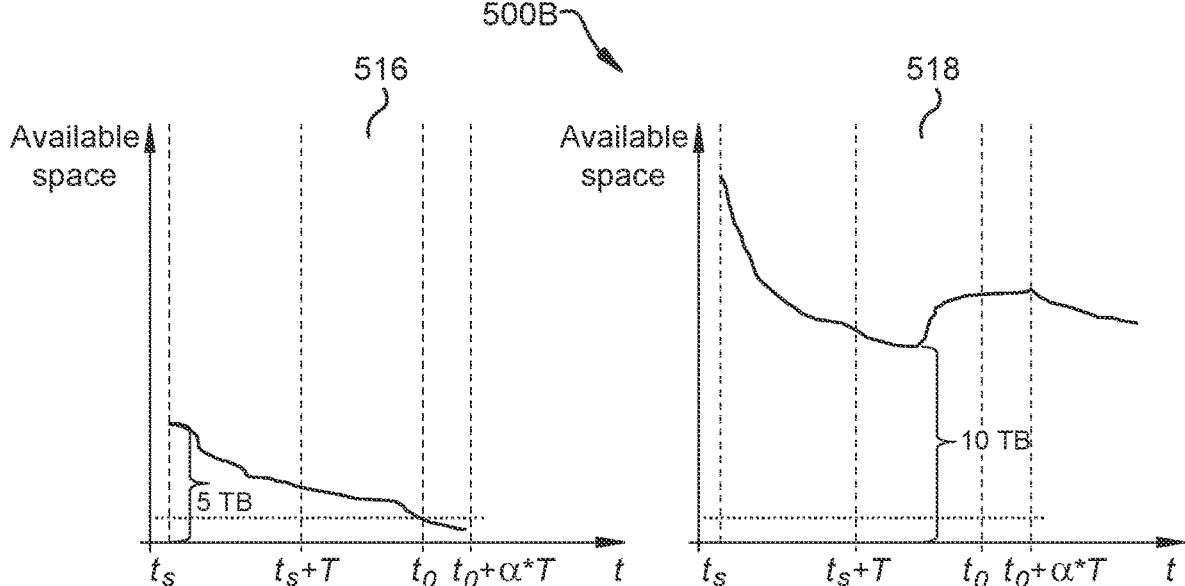

As shown in conjunction with FIG. 5A, FIG. 5A illustrates a schematic diagram of a file system 500A according to some embodiments of the present disclosure, where at moment $t_s$, the used space of a folder 511 may be 0.5 TB, the used space of a folder 512 may be 2.0 TB, the used space of a folder 513 may be 1.2 TB, and the used space of a folder 514 may be 0.3 TB, from which it can be seen that the used space of the folder 512 and the folder 513 is large. In conjunction with FIG. 5B, FIG. 5B illustrates a set of graphs 500B of the change in the available storage space of a storage system over time according to some embodiments of the present disclosure. For example, the graph 516 illustrates a predicted change trend of the available space of the source storage system over time, wherein the available space of the source storage system is getting less and less over time and will experience a shortage of available space at the moment $t_o$. The graph 518 illustrates the predicted change trend of the available space of the target storage system over time, and the target storage system has sufficient available space at the moment $t_o$. Therefore, folders in the file system can be migrated from the source storage system to the target storage system to alleviate the problem of the shortage of available space in the source storage system. In a conventional case, folders with large used space will be migrated. For example, in conjunction with FIG. 5A, the folder 512 has used space of 2.0 TB, and the folder 513 has used space of 1.2 TB; therefore, the conventional storage system prioritizes the migration of the folder 512 and the folder 513, which tends to have high migration costs and poor effects, whereas embodiments of the present disclosure migrate folders based on migration scores. The way to calculate the migration score will be described below at 404. It should be understood that these available-space change curves and used-space change curves are obtained through prediction, and the analysis agent predicts that the source storage system will experience a storage space shortage, so that the migration service is triggered. Therefore, when the analysis agent determines that the current used space is too large, or that the used space is growing at a high rate, it is possible to trigger the migration service.

Figure 5C:
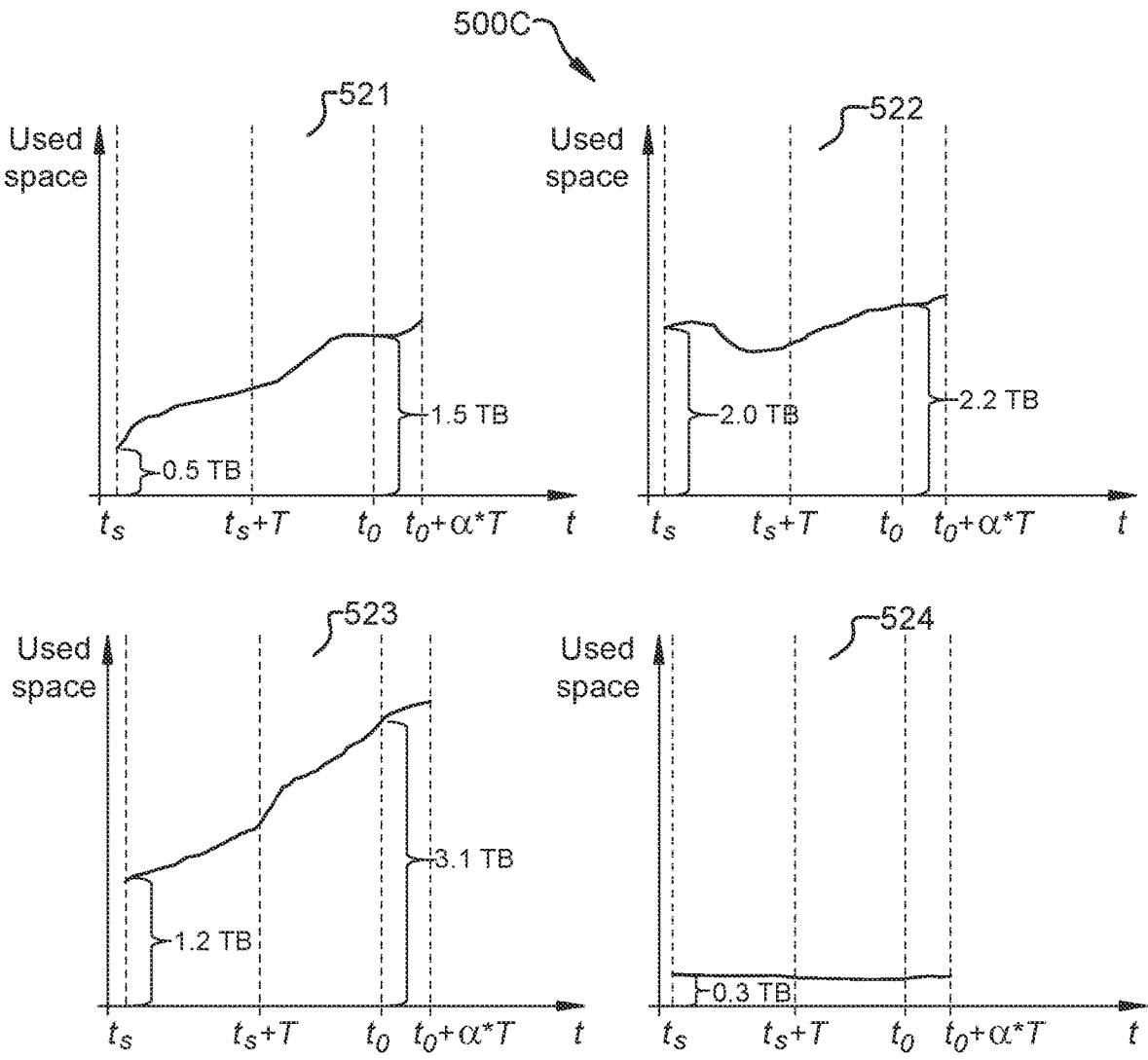

Referring back to FIG. 4, at 404, a group of migration scores for the group of folders are calculated. For example, the group of migration scores can be calculated using the following Equation 2:

$$MQ[k] = \begin{cases} \dfrac{(\text{delta\_space}[k])^2}{\text{used\_space}[k](t_s) + 1}, \text{delta\_space}[k] > 0 \\ -1, \text{delta}_{space[k]} < 0 \end{cases} \quad (2)$$

where MQ[k] denotes a group of migration scores, and when delta$_{space[k]}$≤0, MQ[k] is −1, which means that when the used space of the folder becomes smaller and smaller over time, the corresponding migration score is −1. In addition, when delta_space[k]>0, it can be seen from Equation 2 that the larger the used_space[k](t$_s$) is, the smaller the MQ[k] is, which means that the larger the used space of a folder is, the smaller the corresponding migration score is, because a folder with larger used space has a higher migration cost. In conjunction with FIG. 5C, FIG. 5C illustrates a set of graphs 500C of the used space of folders over time according to some embodiments of the present disclosure. It should be understood that each graph in the graphs 500C is obtained through prediction. The graph 521 corresponds to the used space of the folder 511 in FIG. 5A, the graph 522 corresponds to the used space of the folder 512 in FIG. 5A, the graph 523 corresponds to the used space of the folder 513 in FIG. 5A, and the graph 524 corresponds to the used space of the folder 514 in FIG. 5A. As shown in FIG. 5C, at moment t$_o$, the change in space of the folder 511 is 1 TB (i.e., 1.5 TB-0.5 TB), and similarly, the change in space of the folder 512 is 0.2 TB, the change in space of the folder 513 is 1.9 TB, and the change in space of the folder 511 is 0 TB. Therefore, as described above, the folder 512 and the folder 513 are usually migrated first, which tends to have high migration costs and poor effects. For example, although the used space of the folder 512 at the current moment is larger than that of the folder 511, the change in space of the folder 512 at the moment t$_o$ is smaller than the change in space of the folder 511; therefore, it is a better choice to migrate the folder 511, which has a low migration cost and can better alleviate the problem of storage space shortage at the same time.

Referring back to FIG. 4, at 406, one or more folders to be migrated are selected by sorting the group of migration scores. For example, by sorting the group of migration scores and selecting one or more folders D in the group of folders for migration, the folders with high scores are selected to be migrated at the time of migration while satisfying the condition that the storage space of the source storage system is greater than a storage space threshold after the migration, and the one or more folders to be migrated may be selected in conjunction with Equation 3 below:

$$s_n(t) - \sum_{i=0}^{i} \text{used\_space}[d_i](t) > s_n(t_o) \quad (3)$$

where D=[d$_1$, d$_2$, . . . , d$_I$], which indicates one or more folders to be migrated, and t$_s$<t≤t$_s$+α*T, which indicates that, between t$_s$ and t$_s$+α*T, the storage space of the source storage system should be ensured to be sufficient by migrating one or more folders.

At 408, a target storage system is selected from a set of target storage systems. For example, when selecting the target storage system, it is necessary to ensure that the storage space of the target storage system is greater than a predetermined threshold. For example, the target storage system can be determined by the following Equation 4:

$$\frac{\min\limits_{t_s < t \le t_s + \alpha * T} S_m(t)}{\sum_{i=0}^{I} \text{used\_space}[d_i](t)} > \text{S\_LWM} \quad (4)$$

where S_LWM is the threshold used to determine that the target storage system has sufficient storage space. Furthermore, in some embodiments, when there is a plurality of target storage systems that satisfy the condition, a target storage system with a high bandwidth may be selected so as for a greater speed when migrating folders.

Figure 5D:
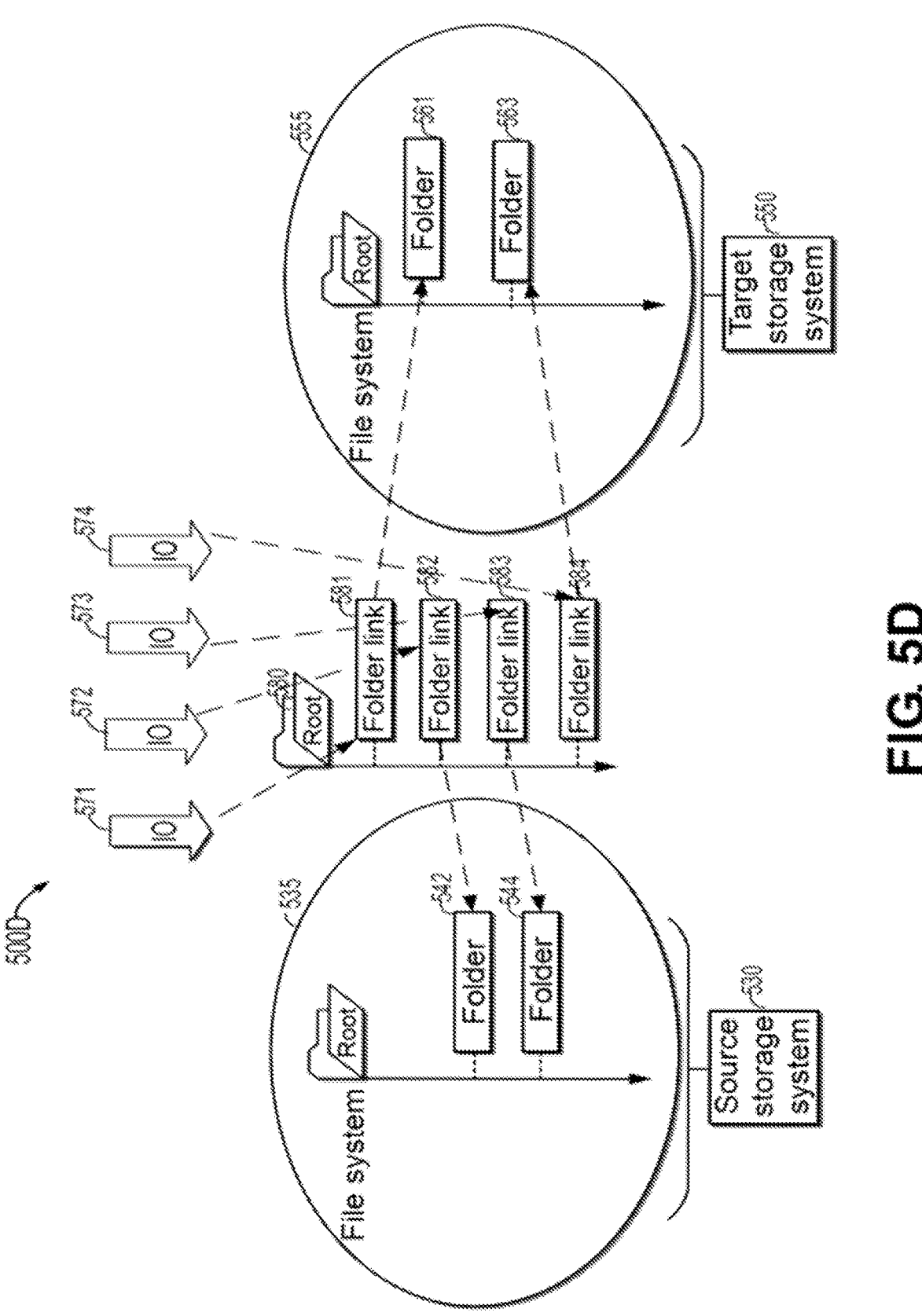

At 410, the one or more folders are migrated to the target storage system, and links for the folders are redirected. For example, after determining the one or more folders to be migrated, the one or more folders are migrated by the migration initiator, and the accessing IOs are redirected via the link file root directory. Described in conjunction with FIG. 5D, FIG. 5D illustrates a schematic diagram of a service file system 500D according to some embodiments of the present disclosure. As shown in FIG. 5D, a file system 535 on a source storage system 530 has a folder 542 and a folder 544, and a file system 555 on a target storage system 550 has a folder 561 and a folder 563. Here, the folder 561 and the folder 563 are migrated from the file system 535 to the file system 555. A folder 581, a folder 582, a folder 583, and a folder 584 on the link file root directory 580 redirect the corresponding IO 571, IO 572, IO 573, and IO 574 to corresponding folders. For example, the IO 573 is redirected to the folder 563 via the folder 583.

FIG. 6 illustrates a flow chart of a method 600 for migrating data according to some embodiments of the present disclosure. When the source storage system experiences a too high IO load, it is necessary to migrate some data from the source storage system to relieve the pressure of the IO load on the source storage system, thus avoiding causing a reduction in the IO speed of the system which affects a user's use. At 602, a set of normalized input/output operations per second (IOPS) for the group of folders are calculated. For example, the normalized IOPS can be calculated by the following Equation 5:

$$\text{average\_iops\_norm}[k] = \frac{K * \text{average\_iops}(k)}{\sum_{k=1}^{K} \text{average\_iops}(k)} \quad (5)$$

where average_iops(k) denotes the IOPS, and average_iops_norm[k] denotes the normalized IOPS, wherein the IOPS may indicate how high or low the IO load on the storage system is.

At 604, a group of migration scores for the group of folders are calculated. For example, in a scenario where the IO load is too high, the migration scores can be calculated by the following Equation 6:

$$MQ[k] = \frac{(\text{average\_iops\_norm}[k])^2}{\text{used\_space}[k](t_s) + 1} \quad (6)$$

where used_space[k](t$_s$) is the used space of a folder at the current moment, so the higher the used space of the folder is, the smaller the migration score is, so as to increase the likelihood of migrating folders with small used space and reduce the cost of migration. At 606, one or more folders to be migrated are selected by sorting the group of migration scores. For example, the sorted group of migration scores are obtained by sorting the group of migration scores, and then one or more folders accounting for a predetermined proportion (e.g., the top 10%) of the sorted group of migration scores are selected for migration.

At 608, a target storage system is selected from a set of target storage systems. For example, the target storage system may be determined by Equation 7 and Equation 8 as follows:

$$\frac{\text{load\_level}(n)}{\text{load\_level}(m)} > 2 \tag{7}$$

$$\frac{\min\limits_{t_s < t \leq t_s + \alpha * T} s_m(t)}{\sum_{i=0}^{J} \text{used\_space}[d_i](t)} > \text{S\_LWM} \tag{8}$$

where load_level(n) denotes an IO load level on the source storage system, and load_level(m) denotes an IO load level on the target storage system, wherein the ratio of the two is greater than 2, which means that the IO of the target storage system is limited to be less than half of the IO load on the source storage system in order to avoid a too high IO load on the target storage system and, by means of Equation 8, the storage space shortage of the target storage system is avoided. Furthermore, in Equation 8, t needs to satisfy $t_s < t \leq t_s + \alpha * T$, so that between $t_s$ and $t_s + \alpha * T$, the source storage system is ensured to have sufficient storage space by migrating one or more folders. Furthermore, in some embodiments, when there is a plurality of target storage systems that satisfy the condition, a target storage system with a high bandwidth may be selected so as for a greater speed when migrating folders. At 610, the one or more folders are migrated to the target storage system, and links for the folders are redirected.

Figure 7:
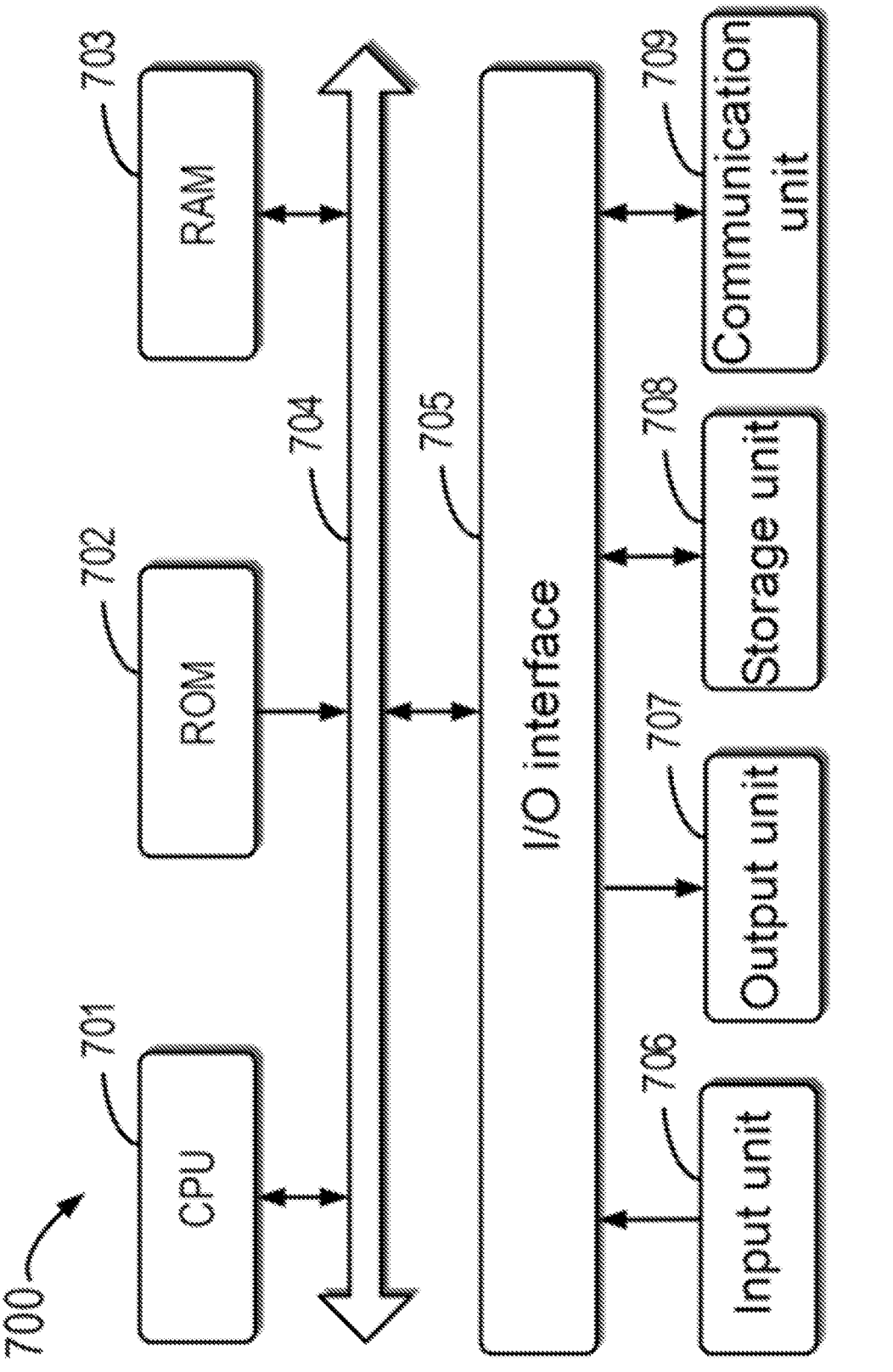
FIG. 7 illustrates a schematic block diagram of a device that can be used to implement the embodiments of the present disclosure.

FIG. 7 illustrates a schematic block diagram of a device 700 that can be used to implement embodiments of the present disclosure. The device 700 may be the device or apparatus described in embodiments of the present disclosure. As shown in FIG. 7, the device 700 includes a central processing unit (CPU) 701 that may perform various appropriate actions and processing according to computer program instructions stored in a read-only memory (ROM) 702 or computer program instructions loaded from a storage unit 708 to a random access memory (RAM) 703. Various programs and data required for the operation of the device 700 may also be stored in the RAM 703. The CPU 701, the ROM 702, and the RAM 703 are connected to each other through a bus 704. An Input/Output (I/O) interface 705 is also connected to the bus 704.

A plurality of components in the device 700 are connected to the I/O interface 705, including: an input unit 706, such as a keyboard and a mouse; an output unit 707, such as various types of displays and speakers; a storage unit 708, such as a magnetic disk and an optical disc; and a communication unit 709, such as a network card, a modem, and a wireless communication transceiver. The communication unit 709 allows the device 700 to exchange information/data with other devices via a computer network, such as the Internet, and/or various telecommunication networks.

The various methods or processes described above may be performed by the processing unit 701. For example, in some embodiments, the method may be implemented as a computer software program that is tangibly included in a machine-readable medium, such as the storage unit 708. In some embodiments, part or all of the computer program may be loaded and/or installed onto the device 700 via the ROM 702 and/or the communication unit 709. When the computer program is loaded into the RAM 703 and executed by the CPU 701, one or more steps or actions of the methods or processes described above may be performed.

In some embodiments, the methods and processes described above may be implemented as a computer program product. The computer program product may include a computer-readable storage medium on which computer-readable program instructions for performing various example embodiments of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various example embodiments of the present disclosure.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flow charts and/or block diagrams. The computer-readable program instructions may also be stored in a computer-readable storage medium. These instructions cause a computer, a programmable data processing apparatus, and/or another device to operate in a particular manner, such that the computer-readable medium storing the instructions includes an article of manufacture which includes instructions for implementing various example embodiments of the functions/actions specified in one or more blocks in the flow charts and/or block diagrams.

The computer-readable program instructions can also be loaded onto a computer, other programmable data processing apparatuses, or other devices, so that a series of operating steps are performed on the computer, other programmable data processing apparatuses, or other devices to produce a computer-implemented process. Therefore, the instructions executed on the computer, other programmable data processing apparatuses, or other devices implement the functions/actions specified in one or more blocks in the flow charts and/or block diagrams.

The flow charts and block diagrams in the accompanying drawings show the architectures, functions, and operations of possible implementations of the device, the method, and the computer program product according to a plurality of embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, the functions denoted in the blocks may also occur in a sequence different from that shown in the figures. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented by a dedicated hardware-based system executing specified functions or actions, or by a combination of dedicated hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other persons of ordinary skill in the art to understand the embodiments disclosed here.

What is claimed is:

1. A method, comprising:
in response to determining that a source storage system satisfies a migration condition and based on a set of used space of a group of folders in a source file system stored on the source storage system, determining, by a system comprising at least one processor, respective migration scores for folders of the group of folders, wherein, in response to the migration condition being that the source storage system is determined to be threshold likely to experience a storage space shortage at a predicted point in time that is later than a current point in time, determining the respective migration scores for the folders comprises:
for each folder of the folders,
determining a respective maximum change in used space of the folder from a respective current used space of the folder at the current point in time that is predicted to occur between the current point in time and the predicted point in time, wherein the respective maximum change in used space is selected from respective changes in used space of the folder from the respective current used space at different points in time between the current point in time and the predicted point in time, wherein the respective changes in used space of the folder at the different points in time are determined based on respective predicted used spaces of the folder at the different points in time, and wherein the respective changes in used space of the folder comprises increases in the respective predicted used spaces of the folder and decreases in the respective predicted used spaces of the folder, and
determining the respective migration scores for the folders based on a function of the respective maximum changes in used space of the folders;
sorting, by the system, the respective migration scores, resulting in a sorted group of migration scores;
selecting, by the system, from the group of folders, one or more folders to be migrated based on a defined optimization criterion associated with the sorted group of migration scores, resulting in selected folders;
selecting, by the system, a target storage system from a set of target storage systems;
migrating, by the system, the selected one or more folders to a target file system in the target storage system, wherein the migrating comprises storing the selected one or more folders on the target storage system; and
redirecting, by the system, one or more links for the selected one or more folders to the target file system.

2. The method according to claim 1, wherein the respective mitigation score for the folder is positive in response to the respective maximum change in used space of the folder being determined to be an increase in used space of the folder.

3. The method according to claim 1, wherein the respective mitigation score for the folder is negative in response to the respective maximum change in used space of the folder being determined to be a decrease in used space of the folder.

4. The method according to claim 1, wherein selecting the target storage system from the set of target storage systems comprises:

determining, from the set of target storage systems, a plurality of target storage systems having storage space greater than a defined space threshold; and determining the target storage system based on a transmission bandwidth of each target storage system of the plurality of target storage systems.

5. The method according to claim 1, wherein, in response to the migration condition being determined to be that an input/output (IO) load of the source storage system consistently exceeds a defined IO threshold for a defined time period according to a defined consistency criterion, determining the respective migration scores for the folders comprises:

for the folders, determining respective average normalized input/output operations per second (IOPS) for the folders by normalizing respective average IOPS for the folders, and determining the respective migration scores for the folders based on the respective current used spaces of the folders and the respective average normalized IOPS for the folders.

6. The method according to claim 5, wherein the defined optimization criterion comprises evaluation of a defined migration proportion.

7. The method according to claim 6, wherein selecting the target storage system from the set of target storage systems comprises:

determining, from the set of target storage systems, a plurality of target storage systems having storage space greater than a defined space threshold and having a respective IO load less than the IO load of the source storage system; and determining the target storage system based on a respective transmission bandwidth of each target storage system of the plurality of target storage systems.

8. A device, comprising:

at least one processor; and at least one memory coupled to the at least one processor and storing instructions, wherein the instructions, when executed by the processor, perform operations, comprising:

in response to determining that a source storage system satisfies a migration condition and based on a set of used spaces of a group of folders in a source file system stored on the source storage system, determining respective migration scores for folders of the group of folders, wherein, based on the migration condition being that the source storage system is threshold likely to experience a storage space shortage at a predicted point in time that is later than a current point in time, determining the respective migration scores for the folders comprises:

for each folder of the folders, determining a respective maximum change in used space of the folder from a respective current used space of the folder at the current point in time that is predicted to occur between the current point in time and the predicted point in time, wherein the respective maximum change in used space is selected from respective changes in used space of the folder from the respective current used space at a plurality of points in time between the current point in time and the predicted point in time, wherein the respective changes in used space of the folder at the plurality of points in time are determined based on respective predicted used spaces of the folder at the plurality of points in time, and wherein the respective changes in used space of the folder comprises increases in the respective predicted used spaces of the folder and decreases in the respective predicted used spaces of the folder, and determining the respective migration score for the folder based on a function of the respective maximum change in used space of the folder;

sorting the respective migration scores for the folders, resulting in a sorted group of migration scores;

selecting, from the group of folders, one or more folders to be migrated based on a defined optimization criterion associated with the sorted group of migration scores, resulting in selected folders;

selecting a target storage system from a set of target storage systems;

migrating the selected one or more folders to a target file system in the target storage system, wherein the migrating comprises storing the selected one or more folders on the target storage system; and redirecting, to the target file system, one or more links for the selected one or more folders to the target file system.

9. The device according to claim 8, wherein the respective migration score for the folder is positive based on the respective maximum change in used space of the folder being an increase in used space of the folder.

10. The device according to claim 8, wherein the respective migration score for the folder is negative based on the respective maximum change in used space of the folder being a decrease in used space of the folder.

11. The device according to claim 8, wherein selecting the target storage system from the set of target storage systems comprises:

determining, from the set of target storage systems, candidate target storage systems having storage space greater than a specified space threshold; and determining the target storage system based on respective transmission bandwidths of the candidate target storage systems.

12. The device according to claim 8, wherein, based on the migration condition being that an (input/output) IO load of the source storage system consistently exceeds a specified IO threshold for a specified time period according to a consistency criterion, determining the respective migration scores for the folders comprises:

determining a respective average normalized input/output operations per second (IOPS) for the folder by normalizing an average IOPS for the folder; and determining the respective migration score for the folder based on the current used space of the folder and the respective average normalized IOPS for the folder.

13. The device according to claim 12, wherein the defined optimization criterion comprises a specified migration proportion.

14. The device according to claim 13, wherein selecting the target storage system from the set of target storage systems comprises:

determining, from the set of target storage systems, candidate target storage systems having storage space greater than a specified space threshold and an IO load less than the IO load of the source storage system; and determining the target storage system based on respective transmission bandwidths of the candidate target storage systems.

15. A computer program product that is stored on a non-transitory computer-readable medium and comprises machine-executable instructions, wherein the machine-executable instructions, when executed, cause a machine to perform operations, comprising:

in response to determining that a source storage system satisfies a migration condition and based on a set of used space of a group of folders in a source file system stored on the source storage system, determining, by a system comprising a processor, respective migration scores for folders of the group of folders, wherein, in response to the migration condition being that the source storage system is determined to be threshold likely to experience a storage space shortage at a predicted point in time that is later than a current point in time, determining the respective migration scores for the folders comprises:

for each folder of the folders, determining a respective maximum change in used space of the folder from a respective current used space of the folder at the current point in time that is predicted to occur between the current point in time and the predicted point in time, wherein the respective maximum change in used space is selected from respective changes in used space of the folder from the respective current used space at multiple points in time between the current point in time and the predicted point in time, wherein the respective changes in used space of the folder at the multiple points in time are determined based on respective predicted used spaces of the folder at the multiple points in time, and wherein the respective changes in used space of the folder comprises increases in the respective predicted used spaces of the folder and decreases in the respective predicted used spaces of the folder, and determining the respective migration score for the folder based on a function of the respective maximum change in used space of the folder;

sorting, by the system, the respective migration scores, resulting in a sorted group of migration scores;

selecting, from the group of folders, one or more folders to be migrated based on a defined optimization criterion associated with the sorted group of migration scores, resulting in selected folders;

selecting a target storage system from a set of target storage systems;

migrating the selected folders to a target file system in the target storage system, wherein the migrating comprises storing the selected folders on the target storage system; and redirecting one or more links for the selected folders to the target file system.

16. The computer program product according to claim 15, wherein the respective migration score for the folder is positive in response to the respective maximum change in used space of the folder being determined to be an increase in used space of the folder.

17. The computer program product according to claim 15, wherein the respective migration score for the folder is negative in response to the respective maximum change in used space of the folder being determined to be a decrease in used space of the folder.

18. The computer program product according to claim 15, wherein selecting the target storage system from the set of target storage systems comprises:

determining, from the set of target storage systems, a plurality of target storage systems having storage space greater than a defined space threshold; and determining the target storage system based on a transmission bandwidth of each target storage system of the plurality of target storage systems.

19. The computer program product according to claim 15, wherein, in response to the migration condition being that an input/output (IO) load of the source storage system is determined to consistently exceed a defined IO threshold for a defined time period according to a consistency criterion, determining the respective migration scores for the folders comprises:

for each folder, determining a respective average normalized input/output operations per second (IOPS) for the folder by normalizing an average IOPS for the folder, and determining the respective migration score for the folder [based on the current used space of the folder and the respective average normalized IOPS for the folder.

20. The computer program product according to claim 19, wherein selecting the target storage system from the set of target storage systems comprises:

determining, from the set of target storage systems, a plurality of target storage systems having storage space greater than a defined space threshold and having a respective IO load less than the IO load of the source storage system; and determining the target storage system based on a respective transmission bandwidth of each target storage system of the plurality of target storage systems.

* * * * *